(12) United States Patent
Hazen et al.

(10) Patent No.: US 11,180,632 B2
(45) Date of Patent: *Nov. 23, 2021

(54) UNSATURATED POLYESTER RESIN SYSTEM FOR CURED IN-PLACE PIPING

(71) Applicant: Interplastic Corporation, Saint Paul, MN (US)

(72) Inventors: Benjamin R. Hazen, Roseville, MN (US); David J. Herzog, Maple Grove, MN (US); Louis R. Ross, Cincinnati, OH (US); Joel R. Weber, Moundsview, MN (US)

(73) Assignee: Interplastic Corporation, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,139

(22) Filed: Oct. 17, 2018

(65) Prior Publication Data

US 2019/0153196 A1 May 23, 2019

Related U.S. Application Data

(63) Continuation of application No. 15/850,486, filed on Dec. 21, 2017, now Pat. No. 10,131,766.

(60) Provisional application No. 62/489,318, filed on Apr. 24, 2017.

(51) Int. Cl.
| | |
|---|---|
| *C08K 5/3415* | (2006.01) |
| *C08K 5/07* | (2006.01) |
| *C08K 3/36* | (2006.01) |
| *C08K 5/098* | (2006.01) |
| *C08K 3/08* | (2006.01) |
| *C08K 5/14* | (2006.01) |
| *C08K 5/19* | (2006.01) |
| *F16L 55/165* | (2006.01) |

(52) U.S. Cl.
CPC ............. *C08K 5/3415* (2013.01); *C08K 3/08* (2013.01); *C08K 3/36* (2013.01); *C08K 5/07* (2013.01); *C08K 5/098* (2013.01); *C08K 5/14* (2013.01); *C08K 5/19* (2013.01); *C08K 2003/085* (2013.01); *C08K 2003/0893* (2013.01); *F16L 55/1656* (2013.01)

(58) Field of Classification Search
None
See application file for complete search history.

(56) References Cited

U.S. PATENT DOCUMENTS

| | | |
|---|---|---|
| 5,017,258 A | 5/1991 | Brown et al. |
| 5,104,691 A | 4/1992 | Edwards et al. |
| 5,653,555 A | 8/1997 | Catallo |
| 6,058,979 A | 5/2000 | Watkins |
| 6,433,098 B1 | 8/2002 | Brown et al. |
| 6,619,886 B1 | 9/2003 | Harrington |
| 6,692,802 B1 | 2/2004 | Nava |
| 7,135,087 B2 | 11/2006 | Blackmore et al. |
| 7,799,228 B2 | 9/2010 | Bornak et al. |
| 8,047,238 B2 | 11/2011 | Wiessner et al. |
| 8,053,031 B2 | 11/2011 | Stanley et al. |
| 8,092,689 B2 | 1/2012 | Gosselin |
| 8,298,360 B2 | 10/2012 | Da Silveira et al. |
| 8,418,728 B1 | 4/2013 | Kiest, Jr. |
| 8,586,653 B2 | 11/2013 | Klopsch et al. |
| 8,636,869 B2 | 1/2014 | Wiessner et al. |
| 8,741,988 B2 | 6/2014 | Klopsch et al. |
| 8,877,837 B2 | 11/2014 | Yu et al. |
| 9,068,045 B2 | 6/2015 | Nava et al. |
| 9,074,040 B2 | 7/2015 | Turshani et al. |
| 9,150,709 B2 | 10/2015 | Klopsch et al. |
| 9,207,155 B1 | 12/2015 | Allouche et al. |
| 9,273,815 B2 | 3/2016 | Gillanders et al. |
| 9,371,950 B2 | 6/2016 | Hairston et al. |
| 9,550,933 B2 | 1/2017 | Chatterji et al. |
| 2004/0053062 A1 | 3/2004 | Nava |
| 2005/0170120 A1 | 8/2005 | Teitelbaum et al. |
| 2006/0173142 A1 | 8/2006 | Nava et al. |
| 2009/0194183 A1 | 8/2009 | Kiest, Jr. |
| 2010/0048824 A1 | 2/2010 | Jansen et al. |
| 2011/0083766 A1 | 4/2011 | Anders |
| 2013/0098535 A1 | 4/2013 | Kiest, Jr. |
| 2013/0261254 A1 | 10/2013 | Mullen et al. |
| 2016/0096918 A1 | 4/2016 | Nava et al. |

FOREIGN PATENT DOCUMENTS

| | | |
|---|---|---|
| EP | 1034394 B1 | 9/2000 |
| EP | 2410230 B1 | 2/2012 |
| EP | 2554359 B1 | 6/2013 |
| JP | 2004 161814 A | 6/2004 |
| WO | 90/03850 A1 | 4/1990 |
| WO | 03/040248 A2 | 5/2003 |
| WO | 2005/042858 A2 | 11/2004 |
| WO | 2013/025513 A2 | 2/2013 |

*Primary Examiner* — Robert T Butcher
(74) *Attorney, Agent, or Firm* — Dykema Gossett PLLC

(57) ABSTRACT

A process to use an unsaturated polyester resin system comprising preparing a curable cumene-quat curing system. The cumene-quat curing system can comprise an unsaturated polyester resin, a peroxide initiator, a quaternary ammonium salt component, a 2,4-pentanedione component, and an inhibitor component. The peroxide initiator can comprise a cumene hydroperoxide component. The process can further comprise applying the curable cumene-quat curing system in a cured-in-place pipe rehabilitation process.

20 Claims, 3 Drawing Sheets

UNSATURATED POLYESTER RESIN SYSTEM FOR CURED IN-PLACE PIPING

CROSS-REFERENCE TO RELATED APPLICATIONS

This application is a continuation of U.S. application Ser. No. 15/850,486, filed 21 Dec. 2017 (the '486 application), which claims the benefit of U.S. application No. 62/489,318, filed 24 Apr. 2017 (the '318 application). The '486 application and the '318 application are both hereby incorporated by reference as though fully set forth herein.

FIELD

Embodiments of the present disclosure generally relate to a system, method, and apparatus for using an unsaturated polyester resin system with cured in-place piping to repair conduits or pipelines.

BACKGROUND

Conduits or pipelines, particularly underground pipes, such as sewer pipes, water lines and gas lines are employed for conducting fluids and frequently require repair due to fluid leakage. The leakage from the conduits or pipelines can move in to the pipe from the environment. Also, the leakage can move outward from the inner portion of the pipe to the surrounding environment. It is desirable to avoid leakage in either case.

Pipe leakage can occur for a variety of reasons. In one instance, the pipe leakage can occur due to improper installation of the original pipe. In another instance, the pipe leakage can occur due to deterioration of the pipe itself as a result of normal aging or the effects of conveying corrosive or abrasive material through the pipeline. Further, cracks can be caused at or near pipe joints from environmental conditions. These environmental conditions can include situations ranging from earthquakes to the movement of large vehicles on the overhead surface or other natural or manmade vibrations. Leaks from conduits or pipelines as described above are undesirable and can result in waste of the fluid being conveyed within the pipeline, or result in damage to areas surrounding the pipeline including possible dangerous health hazards. If the pipeline continues to leak and is not repaired, structural failure of the existing conduit can occur due to soil loss and support of the conduit.

BRIEF SUMMARY

The present disclosure relates to a system and method for the lining of pipelines or passageways, using flexible tubular materials. In particular, the instant disclosure relates to a system and method using flexible tubular materials which are impregnated with a curable unsaturated polyester resin system.

In one embodiment, a process to use an unsaturated polyester resin system comprising preparing a curable cumene-quat curing system can comprise an unsaturated polyester resin, a peroxide initiator, a quaternary ammonium salt component, a 2,4-pentanedione component, and an inhibitor component. The peroxide initiator can comprise a cumene hydroperoxide component. The process can further comprise applying the curable cumene-quat curing system in a cured-in-place pipe rehabilitation process.

In another embodiment, a process can comprise preparing a curable cumene-quat curing system. The cumene-quat curing system can comprise a resin, a peroxide initiator, a quaternary ammonium salt component, a 2,4-pentanedione component, and an inhibitor component. The process can further comprise applying the curable cumene-quat curing system in a cured-in-place pipe rehabilitation process.

DETAILED DESCRIPTION

In one embodiment, this disclosure relates to the lining of pipelines or passageways, using flexible tubular materials which are impregnated with a curable unsaturated polyester resin system which can be placed in a position lining the pipeline or passageway and can be held by fluid pressure against the pipeline or passageway surface until the unsaturated polyester resin system cures to a hard condition leaving a hard lining on the interior of the pipeline or passageway surface. In other embodiments, the unsaturated polyester resin system can be used in other methods or processes using curable resins. This process is known to one of ordinary skill in the art as Cured In-Place Piping (CIPP). A subset of the unsaturated polyester resin can comprise a vinyl ester resin.

Pot-life is the time it takes for a viscosity of a mixed system to increase by a pre-set number. In many cases the pot-life is the amount of time it takes for the viscosity to double. However, in other cases, where the viscosity of the mixed system is very low, the pot-life can be used to state the amount of time it takes for the mixed system to triple, quadruple, or more in viscosity. In one embodiment, the pot-life comprises the amount of time it takes for the viscosity to double. In other embodiments, the pot-life comprises the amount of time it takes for the viscosity to triple, quadruple, or otherwise increase in viscosity. Further, a working time is the amount of time from the point when component A and component B are mixed together to the point when the resulting formulation is no longer usable. Pot-life or an end of a pot-life is often defined as the point at which the viscosity increases significantly due to the reaction between component A and component B. The high viscosity will make it difficult to successfully complete the CIPP process.

One method of using an unsaturated polyester resin system as described herein is to impregnate linings as is disclosed in British Patent No. 1449455, filed 8 Dec. 1972, and issued 15 Sep. 1976, which is hereby incorporated by reference as though fully set forth herein. The impregnated lining can be applied to the pipeline or passageway surface by eversion of same into the pipeline or passageway, using fluid pressure. In various embodiments, the fluid pressure can comprise a heated steam or liquid. In other embodiments, other heated fluids can be used in the curing process.

Figure 1:
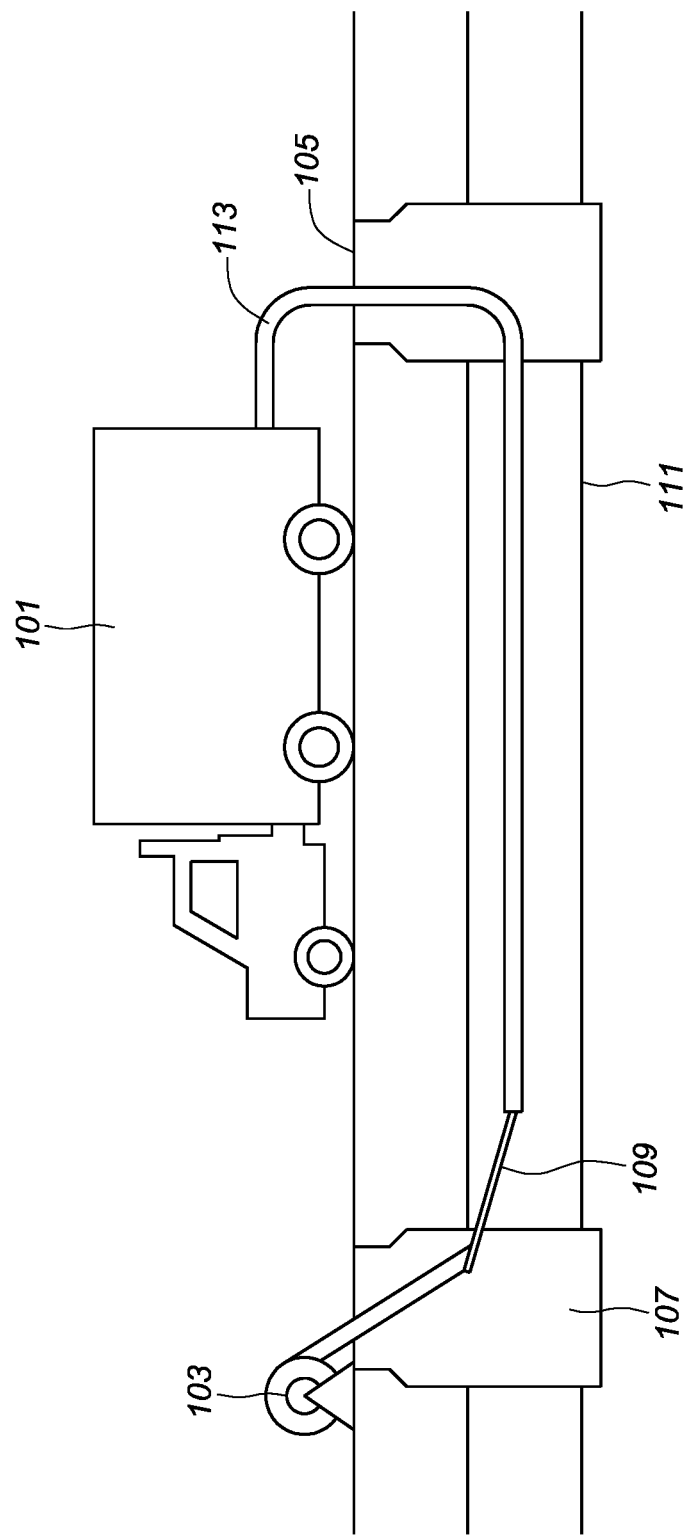
FIG. 1 depicts a diagram of the CIPP process.

FIG. 1 illustrates one method of installing cured in place piping. FIG. 1 depicts a truck 101, a winch 103, a first access shaft 105, a second access shaft 107, a pull wire 109, a previously installed pipe 111, and a CIPP liner 113. The CIPP liner 113 can be stored within the truck 101. In some embodiments, the truck 101 can be refrigerated. By storing the CIPP liner 113 in a truck 101 that can refrigerate the CIPP liner 113, the pot-life of the CIPP liner 113 can be increased. The pull wire 109 can be coupled to the winch 103 and to the CIPP liner 113. The winch 103 can be used to tension the pull wire 109 and to pull one end of the CIPP liner 113 from the truck 101 through the first access shaft 105, and through the previously installed pipe 111.

In previous resins used in the processes described herein, and those used commercially today, a cold storage initiator system can be required. For example, the initiator can comprise a peroxide that requires cold storage. An initiator that requires cold storage can comprise an organic peroxide. The organic peroxide can comprise bis(tert-butylcyclohexyl) peroxydicarbonate (aka di(4-tert-butylcyclohexyl) peroxydicarbonate AkzoNobel's "Perkadox 16" and United Initiator's "BCHPC") and dimyristyl peroxydicarbonate (akzo's "Perkadox 26" and UI's "MYPC"). Perk 16 is the least stable and has caused several shop fires due to inadequate refrigeration or from aged dispersions which were not added to the resin in time The initiators require cold storage to minimize hazard risks and for the initiator to maintain full effectiveness for a desired period of time. Further, the most commonly used initiators are heat activated initiators and are solid materials. The solid initiators must be put into solution immediately before use. The process of adding the initiator in this manner can be a messy and potentially hazardous process. Further, a second initiator, which is usually a liquid initiator, must be added to the process. In other embodiments three initiators, four initiators, or more can be used. As regulations on shipping and storage of initiators used during the processes described herein increase, a new formulation of a curable resin can offer significant advantages. The unsaturated polyester resin system described herein comprises several distinct advantages over those currently in use. In one embodiment, the unsaturated polyester resin system can comprise a single component, liquid initiator. In another embodiment, the unsaturated polyester resin system can comprise a single component, solid initiator. The unsaturated polyester resin system can further comprise an initiator that does not require cold storage and that can be less expensive than initiators currently used. The initiator of the disclosure herein is also readily available in more markets throughout the world and can be shipped without worries of fire or other potentially dangerous incidents as can currently be the case. In one embodiment, when kept refrigerated, the catalyzed unsaturated polyester resin system comprises a pot-life that is similar or substantially similar to those present within the market. In one embodiment, the unsaturated polyester resin system described herein can minimize the risk of hot spots in a CIPP liner while the CIPP liner is curing. In some embodiments, hot spots can be due to peroxide-rich regions within the wet out liner due to inadequately dissolved solid peroxide/catalyst. Further, in one embodiment, the unsaturated polyester resin system used in the CIPP process described herein can exhibit the same mechanical and corrosion resistant properties in the cured product as is found in the currently used commercial systems. In one embodiment, another advantage of the unsaturated polyester resin system described herein is that the cost of the resin is the same or lower than resin systems traditionally used and the requirements for storing the initiator used in the unsaturated polyester resin system is less cumbersome and onerous than initiators that are traditionally used. Further still, in one embodiment, the disclosed unsaturated polyester resin system can exhibit a lower cure exotherm than those found in resin systems that are traditionally used in the CIPP process.

In other embodiments, the unsaturated polyester resin system can comprise an initiator with more than one component, or at least one or more of the components can comprise a non-liquid portion.

The formulations described herein can offer a lower cost and safer system. The unsaturated polyester resin systems described herein can be cured with steam, hot water, or through other processes as would be known to one of ordinary skill in the art. Further, the unsaturated polyester resin systems described herein will cure a CIPP liner wet out with polyester or vinyl ester resin yet still maintain sufficient pot-life. The current industry standard uses "low temperature" peroxides such as Perkadox 16 or Perkadox 26. Both of these low temperature peroxides can be more expensive than the peroxides described herein, and further require sub-ambient storage temperatures. Perkadox 16 or Perkadox 26 are both solid, which require a predispersion process to be performed in a diluent and further incorporation into the resin. If the dispersed peroxide/reactive diluent mixture is stored for too long, which can be as little as a 2-3 hours, fires can be started by the dispersed peroxide/reactive diluent mixture. Further, if the refrigerated storage were to fail or otherwise stop, the dispersed peroxide/diluent mixture can self-combust and start a fire. Further still, the peroxide itself can self-combust.

The unsaturated polyester resin systems described herein can comprise a variety of compounds. In some embodiments, the unsaturated polyester resin system can comprise a Cumene-quat curing system for polyester and vinyl ester resins. The cumene-quat curing system can comprise a redox catalyzed peroxide decomposition which can initiate free radical polymerization. Similar chemistry is further described in U.S. Pat. Nos. 2,740,765, 2,946,770, and 3,080,351. In one embodiment, the Cumene-quat curing system can comprise cumene hydroperoxide, CHP, and quaternary ammonium salts. In this embodiment, the CHP can act as a peroxide initiator for the unsaturated polyester resin system. In another embodiment, tert-butyl hydroperoxide can be used. In yet other embodiments, the peroxide initiator can comprise other compounds as would be known to one of ordinary skill in the art. The Cumene-quat curing system can further comprise 2,4-pentanedione and a high level of inhibitors. In some embodiments, the 2,4-pentanedione can be used at high levels. In one embodiment the 2,4-pentanedione can be used in a range of 1000-6000 ppm. In another embodiment, the 2,4-pentanedione can be used in a range of 3000-5000 ppm. In yet another embodiment, the 2,4-pentanedione can be used in a range of 3500-4000 ppm. In yet another embodiment, the 2,4-pentanedione can comprise more than 3500 ppm of the cumene-quat curing system. In yet other embodiments, other ranges or concentrations can be used. In other embodiments, the Cumene-quat curing system can comprise dimethyl acetoacetamide, ethyl acetoacetate, methyl acetoacetate, and/or AAA. Further, any other compounds can be used which have similar diketone-forming-enol functionality. Similar chemistry is further described in U.S. Pat. No. 3,584,076. In another embodiment, the inhibitor can comprise a level of over 1000 ppm in the unsaturated polyester resin. In some embodiments, the inhibitor can comprise 4-hydroxy TEMPO and/or Arkema's BlocBuilder type inhibitors. In other embodiments, traditional inhibitors used in the art such as hydroquinione, para-benzoquinone, and tert-butylcatechol can be used. Additionally, further inhibitors would be known to one of ordinary skill in the art. In one embodiment, the inhibitor can comprise more than 500 ppm. In another embodiment, the inhibitor can comprise more than 750 ppm. In yet another embodiment, the inhibitor can comprise more than 1000 ppm. In yet another embodiment, the inhibitor can comprise between 1000 and 4000 ppm. In yet other embodiments, the inhibitor can comprise more than 4000 ppm. In some embodiments, the inhibitor can comprise a Nitroxide. In yet other embodiments, the inhibitor can comprise other similar components as would be known to one of ordinary skill in the art. In yet another embodiment, the cumene-quat curing system can further comprise a metal. In some embodiments this metal can comprise copper and/or zinc. In another embodiment, the metal can comprise iron. In other embodiments, the cumene-quat curing system can comprise other metals as would be known to one of ordinary skill in the art. In various embodiments, the cumene-quat curing system can comprise one or more different metals in varying concentrations as described herein.

An unsaturated polyester resin system as described herein can have a pot-life of over 24 hours at 77° F. Further, the unsaturated polyester resin system can have a pot-life of several weeks when stored in refrigerated area.

Table 1 illustrates the cure properties of an unsaturated polyester resin at 140 F with different concentrations of 4-hydroxy TEMPO to determine the effects on gel and cure characteristics. The unsaturated polyester resin is combined with CHP and at least one quaternary ammonium salt. The composition comprises an unsaturated polyester resin at 140 F with 500 ppm benzyltrimethylammonium (BTMAC), 500 ppm tetrabutyl ammonium bromide (TBABr), and 1% CHP (K-90) and the ppm of 4-hydroxy TEMPO (4-HT) listed. In another embodiment, the composition can further comprise 40 ppm copper naphthenate.

TABLE 1

Cure Properties of unsaturated polyester resin with 4-HT concentration varied. The cure system was at 140 F., 500 ppm BTMAC, 500 ppm TBABr, and 1% CHP (K-90).

| 4HT ppm | Gel Times | Peak Exo | Gel to Peak | Cure Times | Pot-life (hrs) |
|---|---|---|---|---|---|
| 1000 | 1.5 | 374 | 1.72 | 3.41 | <24 |
| 1100 | 1.94 | 363.2 | 1.03 | 4.07 | <24 |
| 2000 | 4.54 | 371.29 | 1.47 | 6.78 | <24 |
| 2500 | 5.23 | 359.5 | 2.68 | 7.91 | <24 |
| 3000 | 9.06 | 363.4 | 3.08 | 12.15 | 24 |
| 3100 | 12.83 | 351.1 | 3.93 | 16.74 | >24 |
| 3200 | 14.88 | 338.2 | 3.93 | 18.81 | >24 |
| 3500 | 18.33 | 329.3 | 4.41 | 22.74 | >48 |

While the above table shows benzyltrimethylammonium and tetrabutyl ammonium bromide used in the polyester resin system, other quaternary ammonium salts can be used. Other quaternary ammonium salts can comprise one or more of Acetylcarnitine, Acetylcholine, Aclidinium bromide, Acriflavine, Agelasine, Aliquat 336, Ambenonium chloride, Ambutonium bromide, Aminosteroid, ANNINE-6plus, Atracurium besilate, Benzalkonium chloride, Benzethonium chloride, Benzilone, Benzododecinium bromide, Benzoxonium chloride, Benzyltrimethylammonium fluoride, Benzyltrimethylammonium hydroxide, Bephenium hydroxynaphthoate, Berberine, Betaine, Bethanechol, Bevonium, Bibenzonium bromide, Bis-choline tetrathiomolybdate, Bretylium, Bufothionine, Burgess reagent, Butyrylcholine, Californidine, Candicine, Candocuronium iodide, Carbachol, Carbethopendecinium bromide, Carnitine, Cefluprenam, Cetalkonium chloride, Cetrimonium, Cetrimonium bromide, Cetrimonium chloride, Cetylpyridinium chloride, Chelerythrine, Chlorisondamine, Chlormequat, Choline, Choline chloride, Cimetropium bromide, Cisatracurium besilate, Citicoline, Clidinium bromide, Clofilium, Cocamidopropyl betaine, Cocamidopropyl hydroxysultaine, Complanine, Coptisine, Cyanine, Cyclobis(paraquat-p-phenylene), Decamethonium, 3-Dehydrocarnitine, Demecarium bromide, Denatonium, Dequalinium, Didecyldimethylammonium chloride, Dihydrochandonium, Dimethyldioctadecylammonium chloride, Dimethylphenylpiperazinium, Dimethyltubocurarinium chloride, DiOC6, Diphemanil metilsulfate, Diphthamide, Diquat, Distigmine, Dithiazanine iodide, Domiphen bromide, Doxacurium chloride, Echothiophate, Edelfosine, Edrophonium, Emepronium bromide, Ethidium bromide, Ethyl Green, Euflavine, Fenpiverinium, Fentonium, Fluorocholine, Gallamine triethiodide, Gantacurium chloride, GelGreen, GelRed, Glycine betaine aldehyde, Glycopyrronium bromide, Guar hydroxypropyltrimonium chloride, Hemicholinium-3, Hexafluronium bromide, Hexamethonium, Hexocyclium, Hydroxyethylpromethazine, Hyoscine butylbromide, Indacaterol/glycopyrronium bromide, Ipratropium bromide, Isometamidium chloride, Isopropamide, Jatrorrhizine, Laudexium metilsulfate, Lucigenin, Meldonium, Mepenzolate, Methacholine, Methantheline, Methiodide, Methylatropine, Methylhomatropine, Methylnaltrexone, Methylscopolamine bromide, Metocurine, Miltefosine, Morphine methylbromide, Muscarine, Neurine, Obidoxime, Octatropine methylbromide, Octenidine dihydrochloride, Otilonium bromide, Oxapium iodide, Oxitropium bromide, Oxyphenonium bromide, Pahutoxin, Palmatine, Pancuronium bromide, Pararosaniline, Pentamine, Penthienate, Pentolinium, Perifosine, Phellodendrine, Phosphocholine, Pinaverium, Pipecuronium bromide, Pipenzolate bromide, Poldine, PolyDADMAC, Polyquaternium, Polyquaternium-7, Pralidoxime, Prifinium bromide, Propantheline bromide, Prospidium chloride, Pyridostigmine, Pyrvinium, Quaternium-15, Quinapyramine, Rapacuronium, Rhodamine B, Rimazolium, Rocuronium bromide, Safranin, Sanguinarine, Silane quats, Sinapine, Stearalkonium chloride, Succinylmonocholine, Suxamethonium chloride, Suxethonium chloride, Tetra-n-butylammonium bromide, Tetra-n-butylammonium fluoride, Tetrabutylammonium, Tetrabutylammonium hexafluorophosphate, Tetrabutylammonium hydroxide, Tetrabutylammonium tribromide, Tetraethylammonium, Tetraethylammonium bromide, Tetraethylammonium chloride, Tetraethylammonium iodide, Tetramethylammonium, Tetramethylammonium chloride, Tetramethylammonium hydroxide, Tetramethylammonium pentafluoroxenate, Tetraoctylammonium bromide, Tetrapropylammonium perruthenate, Thiazinamium metilsulfate, Thioflavin, Thonzonium bromide, Tibezonium iodide, Tiemonium iodide, Timepidium bromide, Trazium, Tridihexethyl, Triethylcholine, Trigonelline, Trimethyl ammonium compounds, Trimethylglycine, Trolamine salicylate, Trospium chloride, Tubocurarine chloride, Umeclidinium bromide, and Vecuronium bromide. Further, similar chemistry can occur with phosphonium salts or other onium salts.

Figure 2:
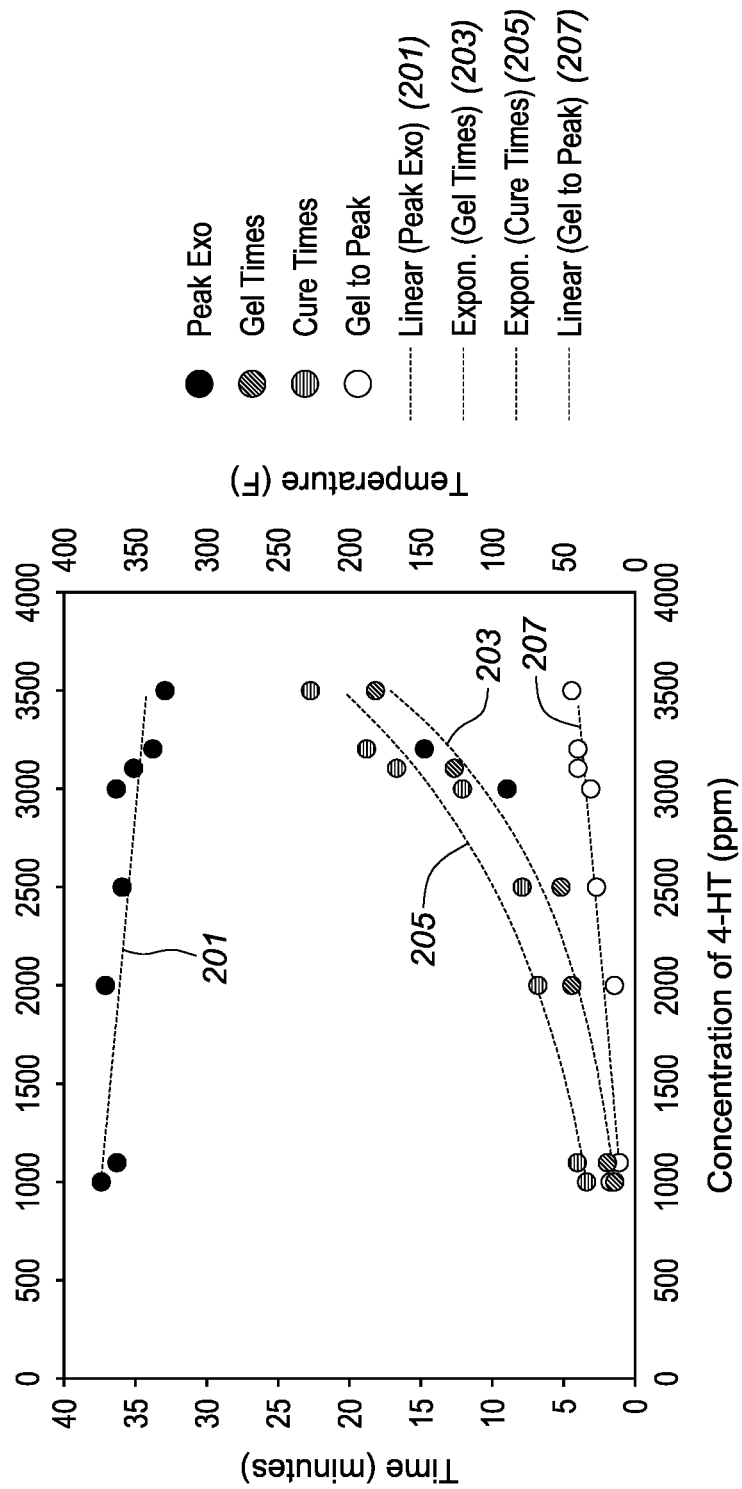
FIG. 2 depicts a graph of the cure properties of one embodiment of an unsaturated polyester resin system with varying levels of 4-hydroxy TEMPO.

FIG. 2 illustrates a graph of the cure properties of one embodiment of an unsaturated polyester resin system with varying levels of 4-hydroxy TEMPO. The graph illustrates the time for different concentrations to reach peak exo 201, the time for different concentrations to gel 203, the time for different concentrations to cure 205, and the time for different concentrations to gel to peak 207. As seen in FIG. 2, the peak exo line 201 follows a linear progression, the gel time line 203 follows an exponential progression, the cure time line 205 follows an exponential progression, and the gel to peak line 207 follows a linear progression.

Figure 3:
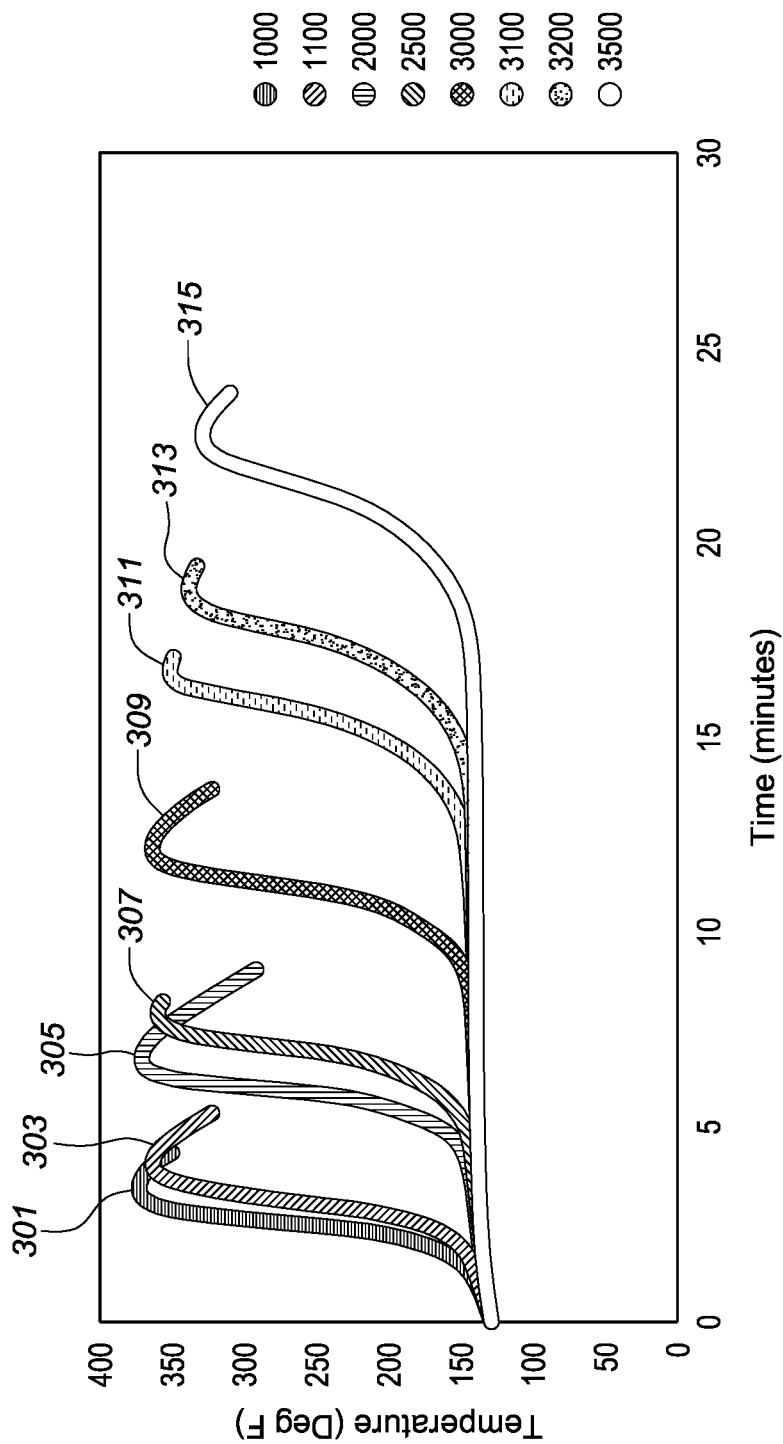
FIG. 3 depicts a graph of the temperature time curves of one embodiment of an unsaturated polyester resin system with varying levels of 4-hydroxy TEMPO.

FIG. 3 illustrates a graph of the temperature time curves of one embodiment of an unsaturated polyester resin system with varying levels of 4-hydroxy TEMPO. The graph illustrates the cure profile for 1000 ppm 4-hydroxy TEMPO 301, 1100 ppm 4-hydroxy TEMPO 303, 2000 ppm 4-hydroxy TEMPO 305, 2500 ppm 4-hydroxy TEMPO 307, 3000 ppm 4-hydroxy TEMPO 309, 3100 ppm 4-hydroxy TEMPO 311, 3200 ppm 4-hydroxy TEMPO 313, and 3500 ppm 4-hydroxy TEMPO 315. As seen in FIG. 3, the curing profile of the unsaturated polyester resin system can be changed based on the concentration of 4-hydroxy TEMPO used within the resin. In general, the gel time lengthens as the concentration of 4-hydroxy TEMPO increases. Further, there is some decrease in exotherm temperatures as well, and the gel to peak time also increases with increasing concentrations of 4-hydroxy TEMPO. As shown in FIGS. 2 and 3, quaternary ammonium salts in combination with CHP can gel and cure at 140 F in less than 15 minutes, with exotherms reasonably high, and stability greater than 24 hours.

While the composition used in table 1 comprises two quaternary ammonium salts, one or more quaternary ammonium salts can be used. Further, while benzyltrimethylammonium chloride and tetrabutyl ammonium bromide are used above, other quaternary ammonium salts can be used. In some embodiments a single quaternary ammonium salt can be used. In other embodiments, a plurality of quaternary ammonium salts can be used.

EXAMPLES

Example 1

An unsaturated polyester resin system (Example 1) comprising

| Product | Weight % |
| --- | --- |
| UNSATURATED POLYESTER RESIN | 62.407 |
| GLYCERINE | 0.075 |
| TWEEN 20 TYPE SURFACTANT | 0.075 |
| CAB-O-SIL | 1.3 |
| AIR RELEASE ADDITIVE | 0.3 |
| STYRENE | 7.7085 |
| ATH, SURFACE MODIFIED | 25.8 |
| 10% TERTIARY BUTYL CATECHOL IN STYRENE | 0.85 |
| QUATERNARY AMMONIUM COMPOUND | 0.35 |
| 2,4-PENTANEDIONE | 0.4 |
| 8% COPPER NAPHTHENATE | 0.0045 |
| ZINC OCTOATE 8% | 0.03 |
| 10% 4-HYDROXY-TEMPO IN STYRENE | 0.7 |

Example 2

An unsaturated polyester resin system (Example 2) comprising

| Product | Weight % |
| --- | --- |
| UNSATURATED POLYESTER RESIN | 62.407 |
| GLYCERINE | 0.075 |
| TWEEN 20 TYPE SURFACTANT | 0.075 |
| CAB-O-SIL | 1.3 |
| AIR RELEASE ADDITIVE | 0.3 |
| STYRENE | 7.5894 |
| ATH, SURFACE MODIFIED | 25.8 |
| 10% TERTIARY BUTYL CATECHOL IN STYRENE | 0.6 |
| QUATERNARY AMMONIUM COMPOUND | 0.4 |
| 2,4-PENTANEDIONE | 0.4 |
| 8% COPPER NAPHTHENATE | 0.0036 |
| ZINC OCTOATE 8% | 0.05 |
| BlocBuilder RC-50 | 1 |

Additional embodiments comprises a styrenated vinyl ester. The styrenated vinyl ester embodiments can achieve the necessary gel time reactivity while maintaining greater than 24 hours of stability at 77° F. Further, the embodiments comprising a styrenated vinyl ester require a relatively small amount of inhibitor to increase the stability to greater than 24 hours. While the below examples comprise a 10% 4-hydroxy TEMPO solution in styrene as an inhibitor, other inhibitors can be used as discussed throughout the application, and as would be known to one of ordinary skill in the art.

Further, an unsaturated polyester resin as described herein can be more reactive than other formulations and, as a result, lower water bath temperatures can be used for curing. In some embodiments, a water bath temperature of 140° F. can be used. In other embodiments, a water bath temperature of 150° F. can be used. In yet other embodiments, other water bath temperatures can be used. The embodiments of the unsaturated polyester resin as described herein can comprise a faster gelling/curing time, but still be stable for extended periods of time at 77° F. when catalyzed. Some embodiments can further comprise 2,4-pentanedione

Example 3

A styrenated vinyl ester (Example 3) comprising

| Product | Weight % |
| --- | --- |
| CORROSION RESISTANT UNSATURATED POLYESTER BASE RESIN | 62.407 |
| SURFACTANTS | 0.45 |
| FUMED SILICA | 1.3 |
| STYRENE | 7.5894 |
| ALUMINUM TRIHYDRATE | 25.8 |
| 10% TERTIARY BUTYL CATECHOL IN STYRENE | 0.85 |
| 75% DICOCO DIMETHYL AMMONIUM CHLORIDE IN ISOPROPYL ALCOHOL | 0.35 |
| 2,4-PENTANEDIONE | 0.4 |
| 8% COPPER NAPHTHENATE | 0.0045 |
| 8% ZINC OCTOATE | 0.03 |
| BlocBuilder RC-50 | 1 |

Example 4

A styrenated vinyl ester (Example 4) comprising

| Product | Weight % |
| --- | --- |
| BASE RESIN | 87.16 |
| FUMED SILICA | 01.27 |
| #1 SURFACTANT | 0.69 |
| #2 SURFACTANT | 0.10 |
| MONOMER | 8.86 |
| QUAT SALT | 0.45 |
| 1% ORGANIC COPPER in MONOMER | 1.09 |
| 10% ORGANIC ZINC in MONOMER | 0.38 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc. The product can be cured using 1% CHP (K-90). The weights used in Example 4 can vary depending on the size of resulting product that is desired. As a result, the weights listed in Example 4 are for illustrative purposes.

Example 5

A styrenated vinyl ester (Example 5) comprising

| Product | Weight % |
| --- | --- |
| BASE RESIN | 87.80 |
| FUMED SILICA | 1.28 |
| #1 SURFACTANT | 0.69 |
| #2 SURFACTANT | 0.10 |
| MONOMER | 8.93 |
| QUAT SALT | 0.45 |
| 1% ORGANIC COPPER in MONOMER | 0.55 |
| 10% ORGANIC ZINC in MONOMER | 0.19 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc. The product can be cured using 1% CHP (K-90). The weights used in Example 5 can vary depending on the size of resulting product that is desired. As a result, the weights listed in Example 5 are for illustrative purposes.

Example 6

A styrenated vinyl ester (Example 6) comprising

| Product | Weight % |
| --- | --- |
| BASE RESIN | 86.33 |
| FUMED SILICA | 1.26 |
| #1 SURFACTANT | 0.68 |
| #2 SURFACTANT | 0.09 |
| MONOMER | 8.78 |
| INHIBITOR | 0.95 |
| QUAT SALT | 0.45 |
| 1% ORGANIC COPPER in MONOMER | 1.08 |
| 10% ORGANIC ZINC in MONOMER | 0.38 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the inhibitor can comprise a 10% 4-hydroxy TEMPO solution in styrene, the quat salt can comprise Adogen 462, the organic copper can comprise 8% elemental copper, and the organic zinc can comprise 8% elemental zinc. The product can be cured using 1% CHP (K-90). The weights used in Example 6 can vary depending on the size of resulting product that is desired. As a result, the weights listed in Example 6 are for illustrative purposes.

Example 7

A styrenated vinyl ester (Example 7) comprising

| Product | Weight % |
| --- | --- |
| BASE RESIN | 86.74 |
| FUMED SILICA | 1.27 |
| #1 SURFACTANT | 0.69 |
| #2 SURFACTANT | 0.10 |
| MONOMER | 8.82 |
| INHIBITOR | 0.48 |
| QUAT SALT | 0.45 |
| 1% ORGANIC COPPER in MONOMER | 1.08 |
| 10% ORGANIC ZINC in MONOMER | 0.38 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the inhibitor can comprise a 10% 4-hydroxy TEMPO solution in styrene, the quat salt can comprise Adogen 462, the organic copper can comprise 8% elemental copper, and the organic zinc can comprise 8% elemental zinc. The product can be cured using 1% CHP (K-90). The weights used in Example 7 can vary depending on the size of resulting product that is desired. As a result, the weights listed in Example 7 are for illustrative purposes.

Example 8

A styrenated vinyl ester (Example 8) comprising

| Product | Weight % |
| --- | --- |
| BASE RESIN | 87.36 |
| FUMED SILICA | 1.27 |
| #1 SURFACTANT | 0.69 |
| #2 SURFACTANT | 0.10 |
| MONOMER | 8.89 |
| QUAT SALT | 0.22 |
| 1% ORGANIC COPPER in MONOMER | 1.09 |
| 10% ORGANIC ZINC in MONOMER | 0.38 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc. The product can be cured using 1% CHP (K-90). The weights used in Example 8 can vary depending on the size of resulting product that is desired. As a result, the weights listed in Example 8 are for illustrative purposes.

Example 9

A styrenated vinyl ester (Example 9) comprising

| Product | Weight % |
| --- | --- |
| BASE RESIN | 86.45 |
| FUMED SILICA | 1.26 |
| #1 SURFACTANT | 0.68 |
| #2 SURFACTANT | 0.09 |
| MONOMER | 8.79 |
| QUAT SALT | 0.45 |

-continued

| Product | Weight % |
| --- | --- |
| 1% ORGANIC COPPER in MONOMER | 1.90 |
| 10% ORGANIC ZINC in MONOMER | 0.38 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc. The product can be cured using 1% CHP (K-90). The weights used in Example 9 can vary depending on the size of resulting product that is desired. As a result, the weights listed in Example 9 are for illustrative purposes.

Example 10

A styrenated vinyl ester (Example 10) comprising

| Product | Weight % |
| --- | --- |
| BASE RESIN | 86.82 |
| FUMED SILICA | 1.27 |
| #1 SURFACTANT | 0.69 |
| #2 SURFACTANT | 0.10 |
| MONOMER | 8.83 |
| QUAT SALT | 0.45 |
| 1% ORGANIC COPPER in MONOMER | 1.09 |
| 10% ORGANIC ZINC in MONOMER | 0.76 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc. The product can be cured using 1% CHP (K-90). The weights used in Example 10 can vary depending on the size of resulting product that is desired. As a result, the weights listed in Example 10 are for illustrative purposes.

Example 11

A styrenated vinyl ester (Example 11) comprising

| Product | Weight % |
| --- | --- |
| BASE RESIN | 86.41 |
| FUMED SILICA | 1.26 |
| #1 SURFACTANT | 0.68 |
| #2 SURFACTANT | 0.09 |
| MONOMER | 8.79 |
| QUAT SALT | 0.45 |
| 1% ORGANIC COPPER in MONOMER | 1.08 |
| 10% ORGANIC ZINC in MONOMER | 0.76 |
| Trigonox C | 0.47 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc, and Trigonox C comprises a peroxide comprising TBPB. The Trigonox C can be added to the styrenated vinyl ester during the curing process along with % CHP (K-90). The product can be cured using 1% CHP (K-90). The weights used in Example 11 can vary depending on the size of resulting product that is desired. As a result, the weights listed in Example 11 are for illustrative purposes.

Example 12

A styrenated vinyl ester (Example 12) comprising

| Product | Weight % |
| --- | --- |
| BASE RESIN | 86.80 |
| FUMED SILICA | 1.27 |
| #1 SURFACTANT | 0.69 |
| #2 SURFACTANT | 0.10 |
| MONOMER | 0.10 |
| QUAT SALT | 0.86 |
| 1% ORGANIC COPPER in MONOMER | 1.09 |
| 10% ORGANIC ZINC in MONOMER | 0.38 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc. The product can be cured using 1% CHP (K-90). The weights used in Example 12 can vary depending on the size of resulting product that is desired. As a result, the weights listed in Example 12 are for illustrative purposes.

Example 13

A styrenated vinyl ester (Example 13) comprising

| Product | Weight % |
| --- | --- |
| BASE RESIN | 86.39 |
| FUMED SILICA | 1.26 |
| #1 SURFACTANT | 0.68 |
| #2 SURFACTANT | 0.09 |
| MONOMER | 8.79 |
| QUAT SALT | 0.85 |
| 1% ORGANIC COPPER in MONOMER | 1.08 |
| 10% ORGANIC ZINC in MONOMER | 0.38 |
| Trigonox C | 0.47 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc, and Trigonox C comprises a peroxide comprising TBPB. The Trigonox C can be added to the styrenated vinyl ester during the curing process along with % CHP (K-90). The product can be cured using 1% CHP (K-90). The weights used in Example 13 can vary depending on the size of resulting product that is desired. As a result, the weights listed in Example 13 are for illustrative purposes.

Example 14

A styrenated vinyl ester (Example 14) comprising

| Product | Weight % |
| --- | --- |
| BASE RESIN | 86.09 |
| FUMED SILICA | 1.26 |
| #1 SURFACTANT | 0.68 |
| #2 SURFACTANT | 0.09 |
| MONOMER | 8.76 |
| QUAT SALT | 0.85 |
| 1% ORGANIC COPPER in MONOMER | 1.89 |
| 10% ORGANIC ZINC in MONOMER | 0.38 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc. The product can be cured using 1% CHP (K-90). The weights used in Example 14 can vary depending on the size of resulting product that is desired. As a result, the weights listed in Example 14 are for illustrative purposes.

Example 15

A styrenated vinyl ester (Example 15) comprising

| Product | Weight % |
| --- | --- |
| BASE RESIN | 85.93 |
| FUMED SILICA | 1.25 |
| #1 SURFACTANT | 0.68 |
| #2 SURFACTANT | 0.09 |
| MONOMER | 8.74 |
| QUAT SALT | 0.85 |
| 1% ORGANIC COPPER in MONOMER | 1.89 |
| 10% ORGANIC ZINC in MONOMER | 0.38 |
| ACCELERATOR | 0.19 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, the organic zinc can comprise 8% elemental zinc, and the accelerator can comprise a copromoter which can comprise 2,4-pentanedione. The product can be cured using 1% CHP (K-90). The weights used in Example 15 can vary depending on the size of resulting product that is desired. As a result, the weights listed in Example 15 are for illustrative purposes.

Example 16

A styrenated vinyl ester (Example 16) comprising

| Product | Weight % |
| --- | --- |
| BASE RESIN | 86.42 |
| FUMED SILICA | 1.26 |
| #1 SURFACTANT | 0.68 |
| #2 SURFACTANT | 0.09 |
| MONOMER | 8.79 |
| QUAT SALT | 0.85 |
| 1% ORGANIC COPPER in MONOMER | 1.90 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, and the organic copper can comprise 8% elemental copper. The product can be cured using 1% CHP (K-90). The weights used in Example 16 can vary depending on the size of resulting product that is desired. As a result, the weights listed in Example 16 are for illustrative purposes.

Example 17

A styrenated vinyl ester (Example 17) comprising

| Product | Weight % |
| --- | --- |
| BASE RESIN | 85.23 |
| FUMED SILICA | 1.24 |
| #1 SURFACTANT | 0.67 |
| #2 SURFACTANT | 0.09 |
| MONOMER | 8.67 |
| QUAT SALT | 0.44 |
| 1% ORGANIC COPPER in MONOMER | 3.27 |
| 10% ORGANIC ZINC in MONOMER | 0.37 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc. The product can be cured using 1% CHP (K-90). The weights used in Example 17 can vary depending on the size of resulting product that is desired. As a result, the weights listed in Example 17 are for illustrative purposes.

Example 18

A styrenated vinyl ester (Example 18) comprising

| Product | Weight % |
| --- | --- |
| BASE RESIN | 84.05 |
| FUMED SILICA | 1.23 |
| #1 SURFACTANT | 0.66 |
| #2 SURFACTANT | 0.09 |
| MONOMER | 8.55 |
| QUAT SALT | 0.43 |
| 1% ORGANIC COPPER in MONOMER | 4.61 |
| 10% ORGANIC ZINC in MONOMER | 0.37 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc. The product can be cured using 1% CHP (K-90). The weights used in Example 18 can vary depending on the size of resulting product that is desired. As a result, the weights listed in Example 18 are for illustrative purposes.

Example 19

A styrenated vinyl ester (Example 19) comprising

| Product | Weight % |
| --- | --- |
| BASE RESIN | 85.83 |
| FUMED SILICA | 1.25 |
| #1 SURFACTANT | 0.68 |
| #2 SURFACTANT | 0.09 |
| MONOMER | 8.73 |
| QUAT SALT | 0.22 |
| 1% ORGANIC COPPER in MONOMER | 2.83 |
| 10% ORGANIC ZINC in MONOMER | 0.38 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc. The product can be cured using 1% CHP (K-90). The weights used in Example 19 can vary depending on the size of resulting product that is desired. As a result, the weights listed in Example 19 are for illustrative purposes.

Example 20

A styrenated vinyl ester (Example 20) comprising

| Product | Weight % |
| --- | --- |
| BASE RESIN | 83.47 |
| FUMED SILICA | 1.22 |
| #1 SURFACTANT | 0.66 |
| #2 SURFACTANT | 0.09 |
| MONOMER | 8.49 |
| QUAT SALT | 0.21 |
| 1% ORGANIC COPPER in MONOMER | 5.50 |
| 10% ORGANIC ZINC in MONOMER | 0.37 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc. The product can be cured using 1% CHP (K-90). The weights used in Example 20 can vary depending on the size of resulting product that is desired. As a result, the weights listed in Example 20 are for illustrative purposes.

Example 21

A styrenated vinyl ester (Example 21) comprising

| Product | Weight % |
| --- | --- |
| BASE RESIN | 86.75 |
| FUMED SILICA | 1.27 |
| #1 SURFACTANT | 0.69 |
| #2 SURFACTANT | 0.10 |
| MONOMER | 8.82 |
| QUAT SALT | 0.48 |
| 1% ORGANIC COPPER in MONOMER | 1.52 |
| 10% ORGANIC ZINC in MONOMER | 0.38 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, the organic copper can comprise 8% elemental copper, and the organic zinc can comprise 8% elemental zinc. The product can be cured using 1% CHP (K-90). The weights used in Example 21 can vary depending on the size of resulting product that is desired. As a result, the weights listed in Example 21 are for illustrative purposes.

Example 22

A styrenated vinyl ester (Example 22) comprising

| Product | Weight % |
| --- | --- |
| BASE RESIN | 87.08 |
| FUMED SILICA | 1.27 |
| #1 SURFACTANT | 0.69 |
| #2 SURFACTANT | 0.10 |
| MONOMER | 8.86 |
| QUAT SALT | 0.48 |
| 1% ORGANIC COPPER in MONOMER | 1.53 |

The base resin can comprise bisphenol-A epoxy based vinyl ester resin, the fumed silica can comprise Cabot CAB-O-SIL M-5, the #1 surfactant can comprise BYK R-605, the #2 surfactant can comprise BYK A-555, the monomer can comprise styrene, the quat salt can comprise Adogen 462, and the organic copper can comprise 8% elemental copper. The product can be cured using 1% CHP (K-90).

The weights used in Example 22 can vary depending on the size of resulting product that is desired. As a result, the weights listed in Example 22 are for illustrative purposes.

As described above all of the Examples discussed throughout this application can be cured at various temperatures. In some embodiments, a water bath temperature of 140° F. can be used. In other embodiments, a water bath temperature of 150° F. can be used. In yet other embodiments, other water bath temperatures can be used. Further, other methods of curing can be used with the above compounds as would be known to one of ordinary skill in the art.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It will be further appreciated that for conciseness and clarity, spatial terms such as "vertical," "horizontal," "up," and "down" may be used herein with respect to the illustrated embodiments. However, these terms are not intended to be limiting and absolute.

Although at least one embodiment for an unsaturated polyester resin system for cured in-place piping system, method, and apparatus has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention claimed is:

1. A curable resin composition comprising:
   an unsaturated polyester resin;
   a peroxide initiator,
   a quaternary ammonium salt component,
   a 2,4-pentanedione component, and
   an inhibitor component, wherein the inhibitor component comprises more than 0.7 percent by weight of the curable resin composition,
   wherein the initiator is a liquid and wherein the curable resin has a pot-life of greater than about 18 hours around 25° C.

2. The curable resin according to claim 1, wherein the inhibitor component comprises a 4-hydroxy-TEMPO solution.

3. The curable resin according to claim 1, wherein the inhibitor component comprises a Nitroxide.

4. The curable resin according to claim 1, wherein the inhibitor component comprises more than 1000 ppm of the curable resin.

5. The curable resin according to claim 1, wherein the peroxide initiator comprises a cumene hydroperoxide component, wherein the 2,4-pentanedione component comprises more than 2500 ppm of the curable resin.

6. The curable resin according to claim 1, wherein the peroxide initiator comprises a single component liquid initiator.

7. The curable resin according to claim 1, wherein the liquid peroxide initiator can be stored at ambient temperatures.

8. The curable resin according to claim 1, further comprising a metal.

9. The curable resin according to claim 8, wherein the metal comprises copper.

10. The curable resin according to claim 8, wherein the metal comprises iron.

11. A curable resin composition for cured in-place piping comprising:
    a resin,
    a peroxide initiator,
    a quaternary ammonium salt component,
    a 2,4-pentanedione component, and
    an inhibitor component, wherein the inhibitor component comprises more than 0.7 percent by weight of the curable resin composition,
    wherein the initiator is a liquid and wherein the curable resin has a pot-life of greater than about 18 hours around 25° C.

12. The curable resin of claim 11, wherein the peroxide initiator comprises a cumene hydroperoxide component.

13. The curable resin of claim 11, wherein the inhibitor component comprises a 4-hydroxy-tempo solution.

14. The curable resin according to claim 11, wherein the inhibitor component comprises a Nitroxide.

15. The curable resin according to claim 11, wherein the inhibitor component comprises more than 1000 ppm of the resin curing system.

16. The curable resin according to claim 11, wherein the 2,4-pentanedione component comprises more than 2500 ppm of the curable resin.

17. The curable resin of claim 11, wherein the curable cumene-quat curing system further comprises a metal.

18. A curable resin composition for cured in-place piping comprising:
    an unsaturated polyester resin,
    a peroxide initiator,
    a quaternary ammonium salt component, a 2,4-pentanedione component, and an inhibitor component, wherein the inhibitor component comprises more than 0.7 percent by weight of the curable resin composition, wherein the initiator is a liquid and wherein the curable resin has a pot-life of greater than about 18 hours around 25° C., and wherein the curable resin is configured to be cured at 140 F in less than 15 minutes.

19. The curable resin of claim 18, wherein the inhibitor component comprises more than 1000 ppm of the curable resin.

20. The curable resin of claim 18, wherein the peroxide initiator comprises a cumene hydroperoxide component.

* * * * *